Sept. 19, 1972  YASUO KIMURA  3,692,623
LINING FOR SHOES
Filed Sept. 21, 1970

Inventor
Yasuo Kimura
by
Edwin E. Greigg

United States Patent Office 3,692,623
Patented Sept. 19, 1972

3,692,623
LINING FOR SHOES
Yasuo Kimura, Neyagawa, Japan, assignor to Kanegafuchi Boseki Kabushiki Kaisha, Tokyo-to, Japan
Filed Sept. 21, 1970, Ser. No. 74,015
Claims priority, application Japan, Sept. 27, 1969,
44/77,274
Int. Cl. B32b 5/18
U.S. Cl. 161—159
4 Claims

ABSTRACT OF THE DISCLOSURE

A continuously porous synthetic resin layer having numerous macropores is provided on the surface of a substrate, the synthetic resin layer being compressed to a thickness of not greater than 70% of the original thickness with application of heat so as to deform the macropores to depressed pores, while being rendered smooth-surfaced or provided with a pattern-embossed smooth surface, if desired, the layer being finished by further coating, and the lining for shoes thus obtained is satisfactory in air permeability, moisture permeability, water absorption and has a smooth surface and excellent touch.

BACKGROUND OF THE INVENTION

Conventionally, horsehides, pigskin and the like have been used as suitable lining materials for shoes because of their attractive appearance and moderate smoothness of the surface, moisture permeability, water absorption, air permeability, agreeable touch and high strength.

Most of the synthetic leathers heretofore produced for linings were produced by applying a synthetic resin solution to the surface of a substrate such as woven fabric and drying the resultant coating, or by joining a sheetlike resin layer to a substrate, and the products obtained were finished by pattern embossing, dyeing or the like in order to provide them with leather-like surfaces.

However, since the synthetic resin layer has a fine structure, such synthetic leathers are extremely poor in properties such as moisture permeability and water absorption which are essential to linings for shoes. Further in the case where a woven fabric is used as the substrate, the woven fabric gets frayed at the cut end to impair the appearance and quality of the shoes.

It is therefore desired to use a non-woven fabric as the substrate and form thereon a synthetic resin layer which insures moisture permeability and water absorption so as to obtain a substitute which is similar to natural leather in appearance, touch and strength.

In accordance with a usual practice, moisture permeability and water absorption are generally provided by subjecting a synthetic resin solution to wet coagulation to form a microporous synthetic resin layer, but where a non-woven fabric coated with a synthetic resin solution is merely subjected to wet coagulation, the rough-surfaced non-woven fabric having uneven coarseness makes it difficult to permit uniform permeation of the synthetic resin solution into the fabric, with the result that the surface smoothness of the resin layer is impaired. Being low in fineness, the resin layer has poor resistance to abrasion.

In order to form a smooth surface by coating a non-woven fabric with a synthetic resin solution and subjecting the resultant coating to wet coagulation, there is a need, for instance, to fill the coarse surface with a resin to prevent uneven permeation of the resin solution before the application of the resin solution. However, such process is complex and costly.

These reasons have heretofore posed limitations to the commercial availability of synthetic leathers for shoe linings which have satisfactory properties as substitutes for natural leather.

As a result of various studies, the present inventor has succeeded in overcoming all of the foregoing difficulties and accomplished the present invention.

SUMMARY OF THE INVENTION

The present invention relates to linings for shoes made of synthetic leather and a method for producing the same, the synthetic leather provided by this invention being composed of a substrate and a porous synthetic resin layer formed thereon which has a smooth and lustrous surface, excellent moisture permeability, water absorption and abrasion resistance.

In accordance with the present invention, a synthetic resin solution is directly applied to the surface of a substrate and the substrate thus coated is then immersed in an aqueous coagulating solution for coagulation, whereby the substrate is covered with a continuously porous synthetic resin layer having a great number of macropores. Instead of forming usual micropores merely by wet coagulation, the present method produces a synthetic resin layer in the form of porous construction incorporating both micropores and numerous macropores by using a synthetic resin solution which contains a water-soluble pore forming agent or an exceedingly great amount of solvent.

However, the product thus obtained is not fit for use as a shoe lining, because although sufficient in moisture permeability and water absorption it is not satisfactory in surface smoothness and wear resistance and has a ruber-like touch without moderate stiffness. Accordingly, the above porous synthetic resin laminate is then subjected to extreme pressure from the surface of the resin layer to effect plastic deformation, whereby the vicinity of the surface area is compressed into a layer of fine texture with resultant advantages of improved abrasion resistance and smoothness of the surface. The provision of the original thick, porous synthetic resin layer results in smooth-surfaced laminate in spite of the rough surface of the substrate, assuring satisfactory appearance well-fit for use as a synthetic leather for linings. Numerous pores still present in the interior of the synthetic resin layer, though deformed into flat shape by the compression, afford sufficient moisture permeability and water absorption.

The particular feature of the present invention that macropores are deformed into depressed pores with varying degree of flatness depending upon the roughness of the substrate surface serves to obtain a smooth-surfaced synthetic resin layer while, despite compression, good air permeability is achieved due to the presence of the residual depressed pores. If compression is effected after provision of a porous resin layer including only micropores, the pores will be eliminated to result in little or no air permeability, whereas the present invention is free of such defect. Because numerous, relatively long, depressed pores are present thereby forming a continuously porous structure, better air permeability, moisture permeability and water absorption are attained than is the case with a laminate which incorporates micropores of the size nearly equal to the small width of the abovementioned depressed pores.

Generally, the use of a hot roll or hot plate engraved with a natural leather-like pattern during the foregoing compression deformation produces an embossed surface resembling the surface of a natural leather and surface coating may further be provided to enhance attractive appearance and luster, strength and smoothness of the surface.

With the presence of the depressed pores in the porous synthetic resin layer laminated on the substrate, the lining for shoes produced has outstanding moisture permeability and water absorption. The surface of the lining has a fine texture, satisfactory smoothness and abrasion resistance, with improved luster and smoothness insured by the surface finishing. In addition, the interior structure of the laminate which, in its entirety, gradually increases in fineness from the substrate side toward the porous resin surface resembles that of the natural leather, thus imparting a natural leather-like touch.

An object of the present invention is to provide a synthetic leather which has staisfactory smoothness, luster, moisture permeability, water absorption and natural leather-like touch which are required for shoe linings to be brought into frictional contact with the sides and heel of the foot all the time.

Another object of the present invention is to provide a lining for shoes made of a synthetic leather comprising a thin porous synthetic resin layer which is excellent in moisture permeability, water absorption and smoothness and which can be readily provided with a pattern-embossed smooth surface.

Still another object of the present invention is to provide a method for producing, with ease and at low cost, an excellent synthetic leather well-suited for lining for shoes.

DESCRIPTION OF THE PREFERRED EMBODIMENTS

Modes of embodying the present invention will hereinafter be described in detail with reference to preferred embodiments and drawings.

Figure 1:
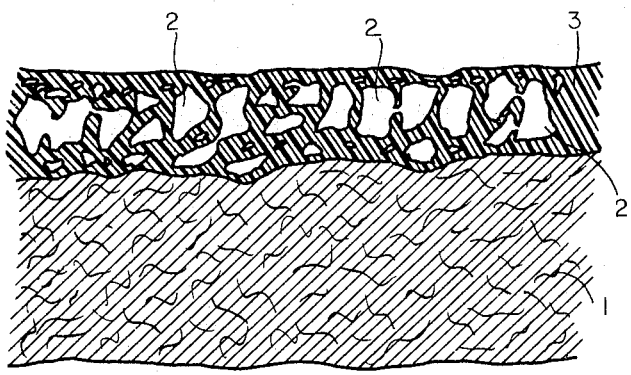
FIG. 1 is an enlarged view in vertical section of a lining material before it is subjected to compression forming.
Figure 2:
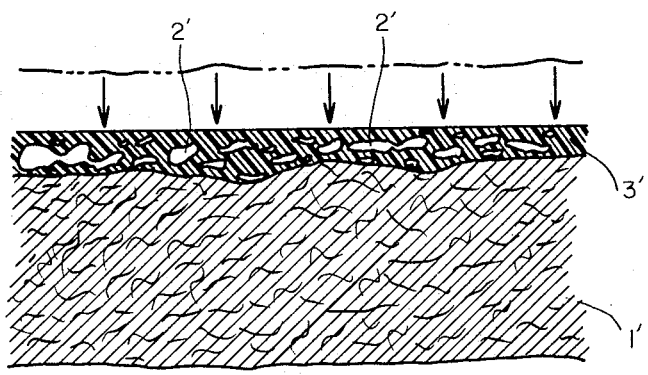
FIG. 2 is an enlarged view in vertical section of a finished lining material obtained by compression forming.

A coating solution prepared by adding a suitable amount of a pore forming agent such as polyethylene glycol, a water-soluble inorganic salt or the like to a synthetic resin solution such as a dimethylformamide solution of polyurethane is applied to the surface of a substrate such as a woven fabric or non-woven fabric is a suitable thickness by roller coating, knife coating or the like. The substrate thus coated with the above solution is immersed in an aqueous coagulating solution for the wet coagulation of the above synthetic resin solution layer. During this process, the synthetic resin solvent (e.g. dimethylformamide) and the water-soluble pore forming agent (e.g. polyethylene glycol or neutral, water-soluble inorganic salt) is extracted into the aqueous coagulating solution, whereby upon coagulation of the synthetic resin (such as polyurethane) a continuously porous synthetic resin layer incorporating numerous macropores 2 as shown in FIG. 1 is formed on one surface of the substrate 1.

The porous layer may suitably be 0.1 to 0.8 mm., preferably 0.2 to 0.5 mm. in thickness. The size (i.e. diameter) of the macropores 2 to be formed in the porous layer is preferably 20 to 70%, most preferably 30 to 60%, of the thickness of the porous layer. The size exceeding 70% is not desirable since it is detrimental to the smoothness of surface of the porous layer.

The laminate thus comprising the substrate 1 and the porous layer formed on the surface thereof (which is hereinafter referred to as "porous laminate") is then washed with water to remove the solvent and pore forming agent and dried.

Next, the porous laminate thus obtained, namely the lining material comprising the porous synthetic resin layer 3 and the substrate 1 is subjected to hot compression from above so as to materially compress the porous synthetic resin layer 3 against the substrate to a thickness of not more than about 70%, preferably of about 50 to 60% of the original thickness. In this procedure, excess compression must be avoided since the pores will be apt to be crushed and eliminated.

Due to the compression with application of heat, macropores 2 are deformed into thin flat pores 2' having a small thickness and relatively large dimensions in the directions parallel to the surface of the porous synthetic resin layer 3, while the layer is rendered perfectly smooth-surfaced or provided with a pattern-embossed, substantially smooth surface. The depressed pores thus deformed have a transverse dimension of 20 to 50% of the thickness of the synthetic resin layer, the ratio of the transverse dimension to the longitudinal dimension being about 1:1.2 to 1:1.6. Although the porous synthetic resin layer 3 and the substrate 1 are subjected to compression at the same time during the above process, the substrate 1' is restored approximately to the original thickness after hot compression, with the porous synthetic resin layer 3' retained in markedly compressed state.

The smooth surface to be provided on the porous synthetic resin layer during the hot compression is formed by means of a smooth-surfaced roller, while a substantially smooth, pattern-embossed surface is produced by an embossed roller.

The hot compression is preferably conducted at a temperature of 120 to 180° C. most preferably at 130 to 150° C.

The lining material thus obtained by extreme compression of the relatively thick, porous, synthetic resin layer 3 has a very smooth surface and fine texture in spite of the rough surface of the substrate 1. Since numerous macropores 2 in the interior are compressed, a considerable number of the macropores 2, even when subjected to extreme compression, are still retained in the porous synthetic resin layer in the form of deformed, depressed pores 2' which provide excellent moisture permeability, air permeability, water absorption with remarkably improved properties of lining ensured for the entire structure including the substrate.

The term "substrate" as herein referred to includes woven fabrics, non-woven fabrics and the like. Among the non-woven fabrics are a non-woven fabric obtained by needle-locking a fiber web (batt) and a non-woven fabric obtained by needle-locking a fiber web (batt) and then impregnating the resulting fabric with synthetic rubber, synthetic resin or the like.

Suitable synthetic resins for forming the porous synthetic resin layer 3 include, for example, polyurethane, polyvinyl chloride, polyamide and the like, the most preferable being polyurethane.

By polyurethane is meant a material obtained by reacting polyisocyanate with polyester diol or polyalkylene glycol ether and chain-extending the resultant prepolymer with a compound having at least two active hydrogen atoms.

The polyurethane may be used with addition of a small amount of a vinyl resin such as vinyl chloride.

Examples of the solvent for the synthetic resin such as polyurethane are N,N'-dimethylformamide, N,N'-dimethylacetamide, tetrahydrofuran, dimethyl sulfoxide, etc.

Suitable water-soluble, pore forming agents to be used in the present invention are polyethylene glycols and water-soluble inorganic salts, the preferable polyethylene glycols being those having an average molecular weight of 200 to 2,000. Examples of desirable water-soluble inorganic salts are sodium chloride, sodium sulfate, ammonium sulfate etc.

The water-soluble pore-forming agent may be used preferably in an amount of 10 to 200% (by weight), most preferably of 20 to 150% (by weight) based upon the weight of the synthetic resin contained in the synthetic resin solution (i.e. the foregoing coating solution).

Employable as the aqueous coagulating solution (bath) are water, aqueous solutions of the above water-soluble inorganic salts.

It is desired that the aqueous coagulating solution (bath) be of a temperature of 30 to 60° C.

Examples of the present embodiment will be given below.

EXAMPLE 1

A fiber web comprising polyester fibers (1.5 denier) and viscose rayon staple fibers (1.5 denier) in the ratio of 50:50 was subjected to needle locking and then impregnated with a styrene-butadiene rubber emulsion. The impregnated web was squeezed out and dried. A coating solution having the following composition was applied to the 0.7 mm. thick non-woven fabric thus obtained in an amount of 400 g./m.$^2$ (i.e. 0.4 mm. in thickness).

Composition of the coating solution

| | Parts of weight |
|---|---|
| Polyurethane resin solution (concentration: 25%, solvent: dimethylformamide) | 100 |
| Sodium chloride | 20 |
| Coloring agent (toner paste) | 15 |

After application, the fabric was immersed in water of 30° C. for 10 min. to coagulate the coating solution, then washed with water and dried. As a result, a laminate (i.e. lining material) having a porous polyurethane layer on one face of the non-woven fabric was obtained. The polyurethane layer had numerous macropores of the sizes (i.e. diameters) of about 0.15 to 0.20 mm., the pores being cellular pores communicating with each other.

The laminate was then pressed by a kid-pattern embossed roller (clearance: 0.4 mm.) heated to 140° C., with the result that a laminate having a thickness of 0.9 mm. was obtained. The laminate was found to include numerous depressed pores 0.1 to 0.12 mm. in height and 0.16 to 0.20 mm. in width.

Then, the surface of the laminate was colored with a gravure coater. The product obtained had excellent luster, smoothness, abrasion resistance and touch. The laminate was found to have outstanding properties of: moisture permeability of 5.1 mg./cm.$^2$/hr., water absorption of 7.5%, tensile stregnth of 0.7 kg./mm.$^2$ (warp) and 0.5 kg./mm. (weft).

The laminate was therefore found to be very excellent as a lining for shoes.

For comparison, another lining was prepared in the same manner as above, except that sodium chloride was not added to the coating solution. The lining had a low moisture permeability of 2.1 mg./cm.$^2$/hr., and a low water absorption of 5.0%, with the tensile strength of: 0.7 kg./mm.$^2$ (warp) and 0.5 kg./mm.$^2$ (weft). The lining was poor in smoothness, luster and touch.

Next, experiment was conducted in accordance with the present invention, using a woven fabric as the substrate 1. A lining was prepared in exactly the same manner as the foregoing example of this invention, except that, in place of the non-woven fabric, a woven fabric comprising 65% of cotton and 35% of polyethylene terephthalate yarns was used. The lining obtained had excellent luster, smoothness, abrasion resistance and touch, along with exceedingly high moisture permeability of 5.0 mg./cm.$^2$/hr. and water absorption of 7.4%.

Further, a porous layer was rendered perfectly smooth-surfaced in accordance with another mode of practicing the present invention. A lining was produced exactly in the same manner as the above method of this invention, except that the foregoing non-woven fabric was used as the substrate and that a plain roller was used instead of the aforementioned kid-pattern embossed roller. The lining obtained was found to have excellent luster, smoothness, abrasion resistance and touch, with moisture permeability of 5.1 mg./cm.$^2$/hr., water absorption of 7.4% and tensile strength of 0.71 kg./mm.$^2$ (warp) and 0.5 kg./mm.$^2$ (weft). These are very outstanding properties to insure usefulness as a lining for shoes.

EXAMPLE 2

To a non-woven fabric obtained under the same conditions as in Example 1 was applied, in the same thickness, a coating solution having the following composition:

| | Parts by weight |
|---|---|
| Polyurethane resin solution (concentration: 25%, solvent: dimethylformamide) | 100 |
| Polyethylene glycol (average molecular weight 400) | 25 |
| Coloring agent (toner paste) | 15 |

Subsequent treatment was also conducted under the same conditions to give a laminate which comprised a porous layer having approximately the same pores as those in Example 1. The product obtained by hot compression was found to be of outstanding smoothness and luster, with moisture permeability of 4.6 mg./cm.$^2$/hr., water absorption of 7.0% and tensile strength of 0.8 kg./mm.$^2$ (warp) and 0.5 kg./mm.$^2$ (weft). The laminate was very useful as a lining for shoes.

The polyurethane resin solution used in the Examples 1 and 2 is "Crysbon 6265," product of Dai Nippon Ink & Chemicals Inc. The testing method of moisture permeability was based upon Japan Industrial Standard 6549. The water absorption was measured after a specimen, 10 cm. x 10 cm., had been left standing for 7 hours in an atmosphere having a temperature of 30±1° C. and a relative humidity of 95±5%. The smoothness was inspected with unaided eye.

What I claimed is:

1. A synthetic material having a smooth surface finish, being water absorptive and moisture and air permeable and having a soft touch rendered suitable for use as a lining for shoes comprising, a first layer of porous polyurethane resin surface bonded to a second layer of a needle-locked fiber web, said porous layer including both micropores and macropores, said macropores being compressed and deformed into thin flat pores, the porous layer being compressed to a thickness of about 50% of the original uncompressed thickness, the uncompressed thickness of said porous layer having been 0.1-0.8 mm., the compression of said porous layer having caused said macropores to have a transverse dimension 20% to 50% of the thickness of said compressed porous layer, the ratio of said transverse dimension to the longitudinal dimension ranging from 1:1.2 to 1:1.6.

2. A lining for shoes as set forth in claim 1, wherein said porous polyurethane resin layer has a substantially smooth fine surface after said compression.

3. A lining for shoes as set forth in claim 1, wherein said porous polyurehtane resin layer has an embossed smooth surface after said compression.

4. A lining for shoes as set forth in claim 1, wherein said needle-locked fiber web is pre-impregnated with a synthetic rubber.

References Cited

UNITED STATES PATENTS

| | | | |
|---|---|---|---|
| 3,228,786 | 1/1966 | Fitzgerald et al. | 161—DIG. 2 |
| 3,306,967 | 2/1967 | Turkewitsch | 161—190 |
| 3,384,531 | 5/1968 | Parrish | 161—159 |
| 3,520,767 | 7/1970 | Manwaring | 161—190 |
| 3,524,791 | 8/1970 | Bethman et al. | 161—159 |
| 3,544,357 | 12/1970 | Noda et al. | 117—135.5 |
| 3,565,981 | 2/1971 | Lauro | 117—135.5 |

MORRIS SUSSMAN, Primary Examiner

U.S. Cl. X.R.

36—55; 117—135.5; 161—.002, 151, 190